United States Patent [19]

Asquith

[11] Patent Number: 5,025,540
[45] Date of Patent: Jun. 25, 1991

[54] FLEXIBLE FILE HOLDER

[76] Inventor: Nicholas A. Asquith, Turret House, Youlgreave, Derby, United Kingdom, DE4 1WL

[21] Appl. No.: 269,533
[22] PCT Filed: Mar. 7, 1988
[86] PCT No.: PCT/GB88/00169
    § 371 Date: Dec. 14, 1988
    § 102(e) Date: Dec. 14, 1988
[87] PCT Pub. No.: WO88/06502
    PCT Pub. Date: Sep. 7, 1988

[30] Foreign Application Priority Data
Mar. 6, 1987 [GB] United Kingdom ............. 8705324

[51] Int. Cl.⁵ .................................... B23D 71/06
[52] U.S. Cl. ................................... 29/80; 30/513
[58] Field of Search ............ 29/78, 80; 51/363; 30/506, 507, 509, 513

[56] References Cited

U.S. PATENT DOCUMENTS

| | | | |
|---|---|---|---|
| 191,811 | 6/1877 | Nicholson | 29/80 |
| 1,657,748 | 1/1928 | Hanning | 30/513 |
| 1,707,207 | 3/1929 | Bianchi et al. | 29/80 |
| 1,714,514 | 5/1929 | Malloy | 29/80 |
| 1,956,882 | 5/1934 | Stowell | 29/80 |
| 2,127,176 | 8/1938 | Kroecker | 29/80 |
| 2,143,063 | 1/1939 | Fetterolf | 29/78 |
| 2,716,848 | 9/1955 | Schmidt | 51/187 |
| 2,725,911 | 12/1955 | Glenn | 30/513 |
| 3,531,841 | 10/1970 | McCord | 29/80 |

FOREIGN PATENT DOCUMENTS 1917872 10/1969 Fed. Rep. of Germany .
0810756 3/1937 France .

Primary Examiner—William E. Terrell
Attorney, Agent, or Firm—W. Thad Adams, III.

[57] ABSTRACT

A file holder 10 allows a blade 12 to be attached to a base 20, such as by grub screws. At one end of the base 20 there is a handle 16 rotatably mounted on the base 20 and incorporating a cam surface. A tension bar 18 extends between the handle 16 and the other end of the base 20. The tension bar 18 incorporates a cam follower which bears on the cam surface in the handle 16 so that as the handle 16 is rotated, the separation of the two points is cuased to vary, so that base 20 and the blade 12 flex to a degree which depends on the position of the handle 16 in relation to the base 20.

16 Claims, 5 Drawing Sheets

FLEXIBLE FILE HOLDER

The present invention relates to file holders, that is to articles to which a file blade is attached when in use, to facilitate handling and use of the blade. The present invention relates in particular to holders for flexible file blades.

Flexible file blades are manufactured for use for a variety of operations on various materials. For instance, blades with various degrees of coarseness are manufactured. In some applications, the blade is used in a straight, unflexed condition, but in other applications, it may be desirable for the blade to be flexed.

A file holder has been proposed which allows the file blade to be held in a flexed condition and which allows the degree of flexing to be selected. The blade is attached to a base member, the ends of which are connected by a screw connection. The screw connection may be tightened or loosened to draw the ends of the base together, thereby flexing the blade, or to allow the base and blade to relax and straighten.

This proposal has been found to have disadvantages. The need for carefully machined screw threads and for associated components of sufficient strength unduly increases manufacturing costs. Furthermore, it is found in practice that when the degree of flexing is to be changed considerably, for instance to take the blade from its unflexed condition to the maximum degree of flexing, operation of the screw connection is unduly time-consuming.

It is an object of the present invention to obviate or mitigate these or other disadvantages of the prior art.

According to the present invention there is provided a file holder comprising first and second attachment means for attaching a flexible file blade to the holder at two spaced positions, a first member incorporating a cam surface and being so connected to the first attachment means as to be movable with respect thereto, a second member connected to the second attachment means and incorporating a cam follower bearing on the cam surface, the cam surface being so shaped as to vary the separation of the attachment means as the first member moves, whereby a file attached to the holder may be variably flexed.

Preferably a flexible base member is provided which carries the attachment means and the first and second members. The attachment means may be detachable from the base member. Preferably the attachment means and the base member are so arranged that a file mounted in the holder lies along the base, the base and the file flexing together as the first member is moved.

Preferably the first member is rotatable on the base member. The first member may rotate about a first axis, the cam surface being circular and centered on a second axis. Preferably the first member comprises an arcuate slot, the walls of which provide the cam surface. The cam surface may be formed by the surfaces of a groove or recess in the slot walls.

Preferably the second member extends into the slot, and the cam follower comprises a lug which engages the cam surface provided by the walls. The cam follower may comprise a second, oppositely directed lug engaging a second cam surface, the cam surfaces being provided by respective walls of the slot. Preferably the mouth of the slot is relatively narrow and the width of the slot in the region of the cam surface is relatively wide, whereby the lugs retain the second member in the slot. Preferably the first member comprises two parts each providing one of the cam surfaces and attachable together to form the slot therebetween.

Preferably the second member is in the form of a bar having the cam follower at a first end and being rotatably attached to the second attachment means at its second end. Preferably the second end is attached to the base member by means of two lugs attached to the base member and between which the second end is located by means of co-operating pins and sockets. Preferably the walls of the sockets define entrance slots through which the pins may enter the sockets. The pins may be a snap-fit through the entrance slots. There may be provided an opening in the base member between the lugs, through which the first end of the second member may be threaded and drawn until the pins enter the sockets to engage the second end with the lugs on the base.

Preferably the first member comprises an integral handle by means of which the first member may be rotated. The integral handle may comprise a portion around which the fingers of a user may be closed to grasp the handle, the cam surface being so shaped that, in use, the graspable portion is generally parallel to an unflexed file blade held in the holder. Preferably the holder further comprises a releasable detent or ratchet mechanism operable to lock the first member in a chosen orientation and thereafter to retain the attachment means with the corresponding separation until the mechanism is released.

The holder may comprise a first moulded member forming the base member and the lugs, a second moulded member forming the said second member, and moulded members attachable to form the first member. Alternatively, the base member and lugs may be separately formed. Preferably the moulded members are moulded from a plastics material.

One embodiment of the present invention will now be described, in more detail, by way of example only, and with reference to the accompanying drawings in which.

Figure 1:
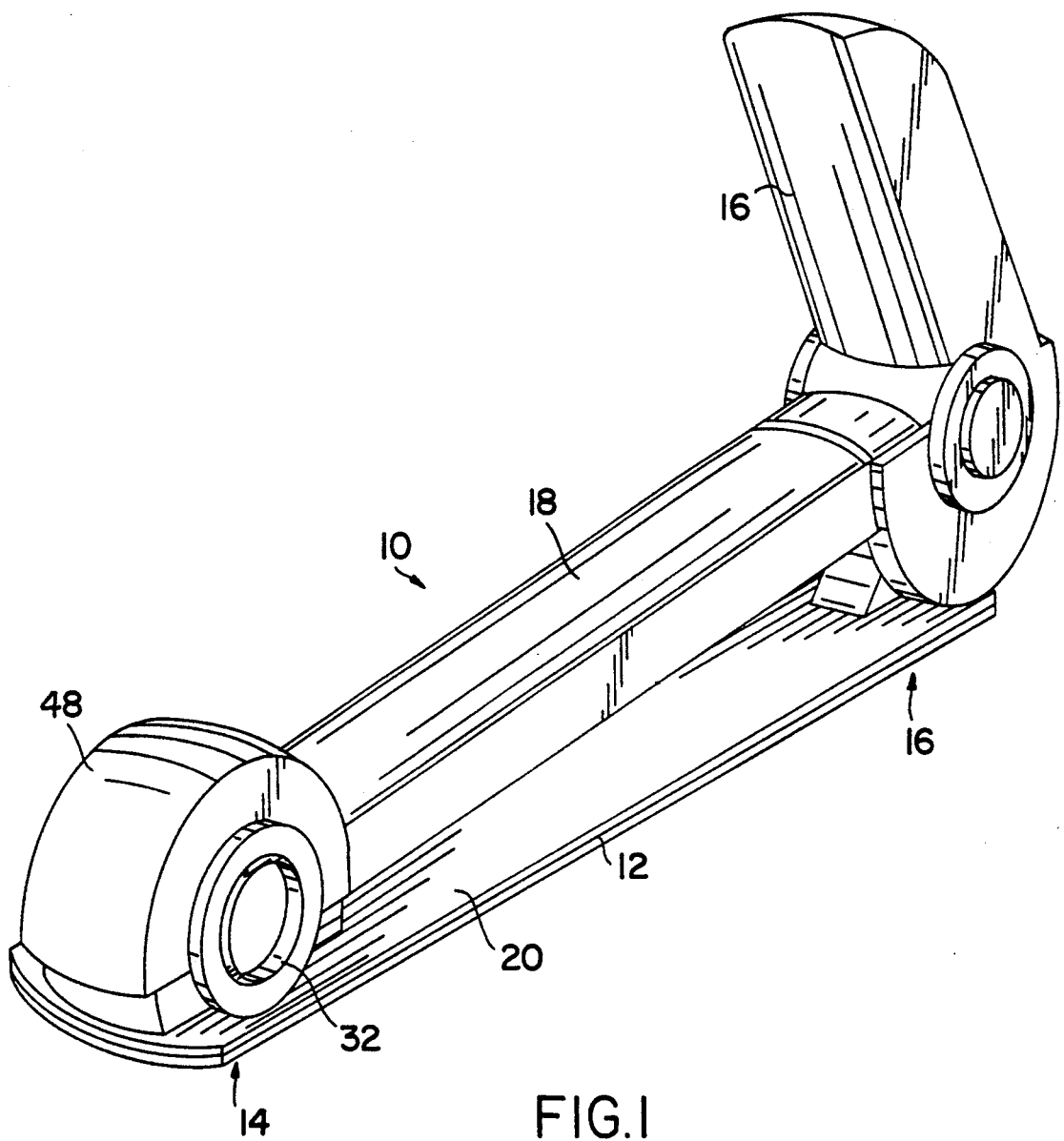
FIG. 1 is a perspective view of a first embodiment of a file holder according to the present invention.

Referring to FIG. 1 of the drawings, there is shown a file holder 10 comprising first and second attachment means for attaching a flexible file blade 12 to the holder 10 at two spaced positions indicated by arrows 14. A first member 16, in the form of a handle incorporates a cam surface and is so connected to the attachment means as to be movable by rotation with respect thereto. A second member, in the form of a tension bar 18 incorporates a cam follower which bears on the cam surface of the handle 16. The cam surface is so shaped as to vary the separation of the attachment means (at 14) as the handle 16 moves, whereby the file blade 12 attached to the holder 10 may be variably flexed.

A second embodiment of the holder is shown in more detail in the remaining Figs. The two embodiments are identical in structure and operation except that the embodiment of FIG. 1 has been styled for greater aesthetic appeal. This styling may include surface ribbing, if desired. In view of the close relation between the embodiments, the same numerals are used for corresponding elements of the embodiments.

The attachment means are in the form of threaded sockets for receiving small grub screws to attach the flexible blade 12 to a base 20 which is also flexible. The attachment means hold the blade in a position lying along the base 20. The handle 16 is rotatably mounted on the base member 20 in the vicinity of a first of the attachment means. The tension bar 18 extends from the handle 16 and is pivotally connected to the base 20 in the vicinity of the other attachment means. The pivot axis of the handle 16 and of the tension bar 18 are indicated by numerals 22, 24 respectively in FIG. 2.

The file holder 10 is constructed from three principle components. These are the base member 20, shown in FIGS. 3 and 4, the tension bar 18 shown in FIG. 5 and the handle 16 shown in FIG. 6.

Figure 3:
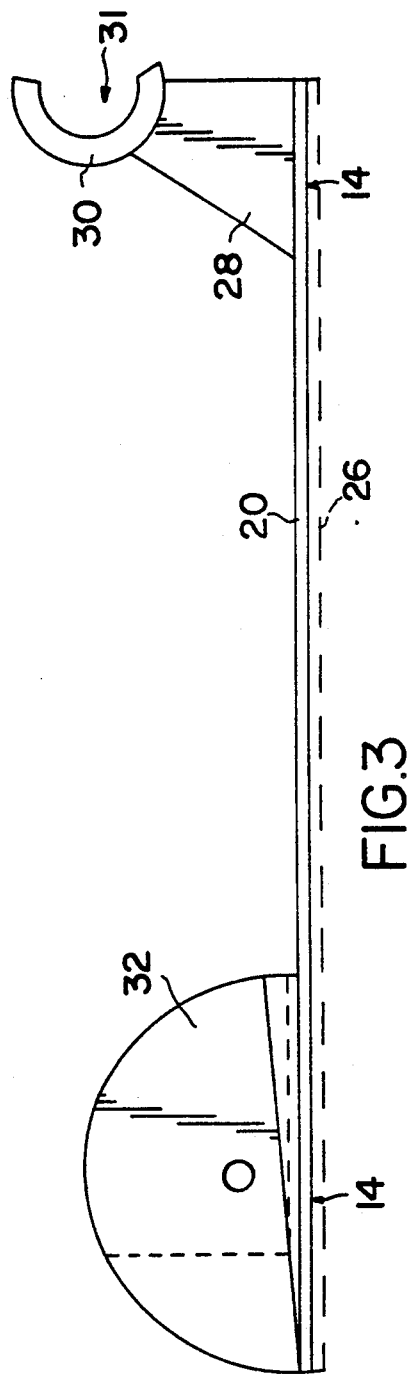
FIGS. 3 and 4 show the base member of the holder of FIG. 2.
Figure 4:
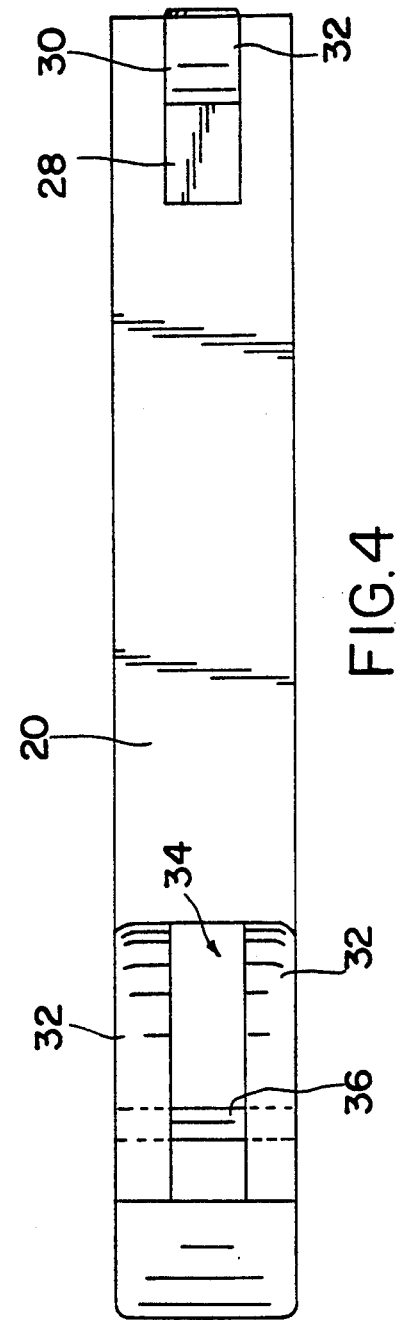

Turning to FIGS. 3 and 4, the base 20 is an elongate rectangular plate of substantially the same length and breadth as the file blades with which the holder is intended to be used. A threaded socket is provided near each end of the base 20, at positions indicated by arrows 14, for receiving a grub screw to secure a file blade in position as indicated by broken lines 26 in FIG. 3.

At one end of the base 20, a plinth 28 extends upwardly. The plinth 28 carries at its upper end an integrally formed cylindrical member 29 which defines a cylindrical recess 31 for receiving a shaft forming part of the handle to be described. The extremities of the cylindrical member 29 form arcuate flanges 30 which project to either side of the plinth 28.

At the other end of the base 20, two lugs 32 are moulded integrally with the base 20. A space 34 is defined between the lugs 32. A pivot pin 36 is mounted in the lugs 32 to extend across the space 34. The upper surfaces of the lugs 32 are circularly cylindrical and centered on the axis of the pivot pin 36.

Figure 5:
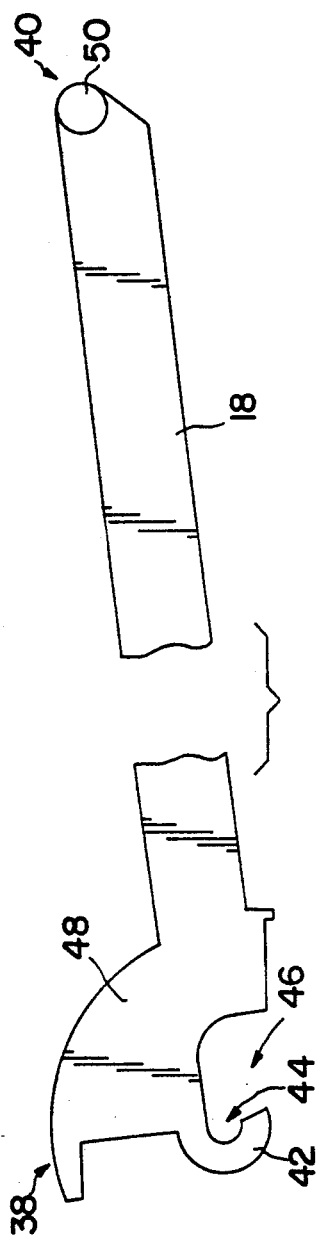
FIG. 5 shows the tension bar of the holder of FIG. 2.
Figure 8:
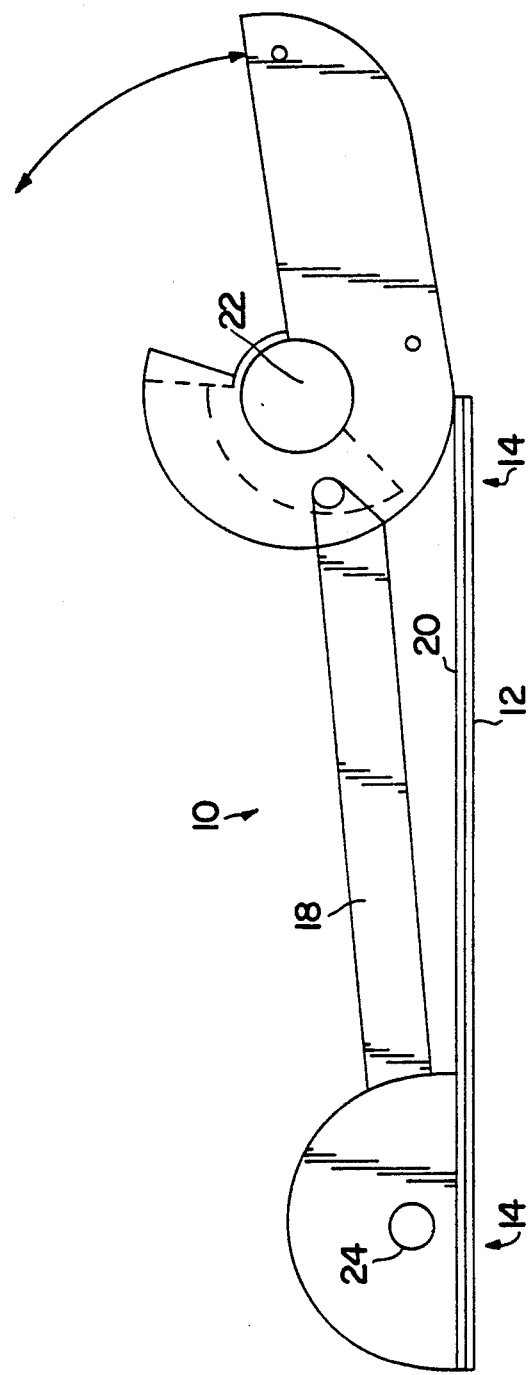
FIG. 8 is an elevation of the holder of FIG. 2 in an alternative position.

FIG. 5 shows the tension bar 18. This comprises a square-section bar extending between a hooked terminal portion 38 and a lugged terminal portion 40. The hooked terminal portion 38 comprises a generally circular hook 42 of sufficient size to engage over and be pivotable around the pivot pin 36. That is, the hook 42 provides a socket 44 for receiving the pin 36. An oversize entrance slot 46 allows the pivot pin to be introduced into the socket 44. The hook is moreover formed to make the pin 36 a snap-fit into the socket 44. That is, slight pressure is required to deform the hook 42 in order to push the pivot pin 36 from the entrance slot 46 into the socket 44. Once the pivot pin has been located in the socket 44, the resilience of the hook 42 will retain it in position during normal use.

Above the hook 42, there is provided a fin 48. This has an outer, circular surface centered on the center of the socket 44. The radius of the outer surface of the fin 48 is such that the outer surface is aligned with the upper surfaces of the lugs 32 when the pivot pin 36 is located in the socket 44. This provides a neat appearance in the assembled article. In the embodiment of FIG. 1, a different appearance is given to the assembled article by using a fin of generally semi-circular shape, and of larger radius than the lugs 32, which are in the form of rings.

The lugged terminal portion 44 incorporates two short cylindrical lugs 50 extending to respective sides of the bar 18. The axes of the lugs 50 are aligned and are parallel to the axis of the socket 44.

Figure 6:
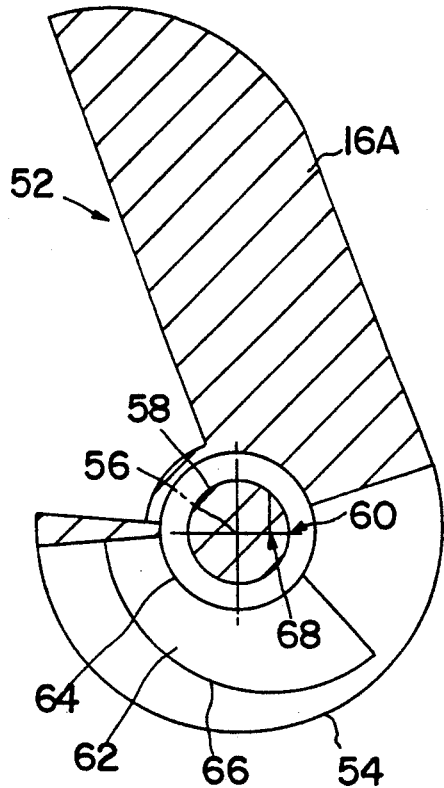
FIGS. 6 and 7 show part of the handle of the holder of FIG. 2.
Figure 7:
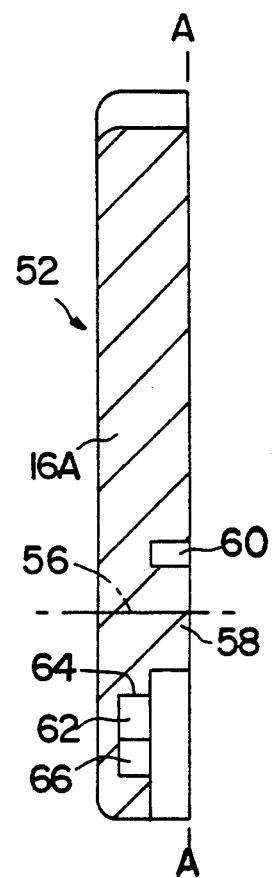

One of a pair of members for use in forming the handle 16 is shown in FIGS. 6 and 7. Section lines in FIG. 6 indicate surfaces in the plane A—A, that is, surfaces which meet corresponding surfaces on the other handle half from which the complete handle is formed. The other handle half is a mirror image in the plane A—A of the handle half shown.

The handle half 16A has an upper grip portion 52 which is held by the user and may be profiled to provide a comfortable, secure grip. At its lower end, the handle half 16A has a circular outer surface 54 centered on an axis 56 which is the central axis of a circularly cylindrical stub 58. A circular channel 60 extends around the stub 58. Between the channels 60 and the outer surface 54, there is formed a further depression 62. This has a first circular wall 64 centered on the axis 56 and a second circular wall 66. The wall 66 is centered on an axis 68 which is spaced from, but parallel to the axis 56. It will therefore be understood that as the handle half 16A rotates about the axis 56, the wall 66 acts as a cam surface by virtue of its different axis 68.

The file holder can be assembled in the following manner. Firstly, the tension bar 18 is connected to the base 20 by snap-fitting the hook 42 onto the pivot pin 36. The tension bar 18 is thereby pivotable on the base 20. The tension bar 18 can then be laid down on the base 20, in which position the hooked terminal portion 40 will be located close to the plinth 28, and between the plinth 28 and the lugs 32. With the tension bar 18 in this position, the handle 16 is assembled by attaching together two handle halves.

The two halves are fitted together around the plinth 28 so that the circular flanges 30 are located in the circular groove 60 formed around the shaft formed by the abutting stubs 58 of the two handle halves. This arrangement rotatably mounts the handle on the plinth 28. The flanges 30 run in the channel 60 as the handle rotates on the plinth 28. The lugged terminal portion 40 is located within the slot indicated at 70 in FIG. 7 and formed between the handle halves. The lugs 50 are positioned in the depressions 62, and prevent the lugged portion 40 leaving the slot in the handle. Moreover, the lugs 50 can bear on respective outer walls 66 of the handle halves as the handle turns, so that the walls 66 act as cam surfaces and the lugs 50 act as cam followers.

Figure 2:
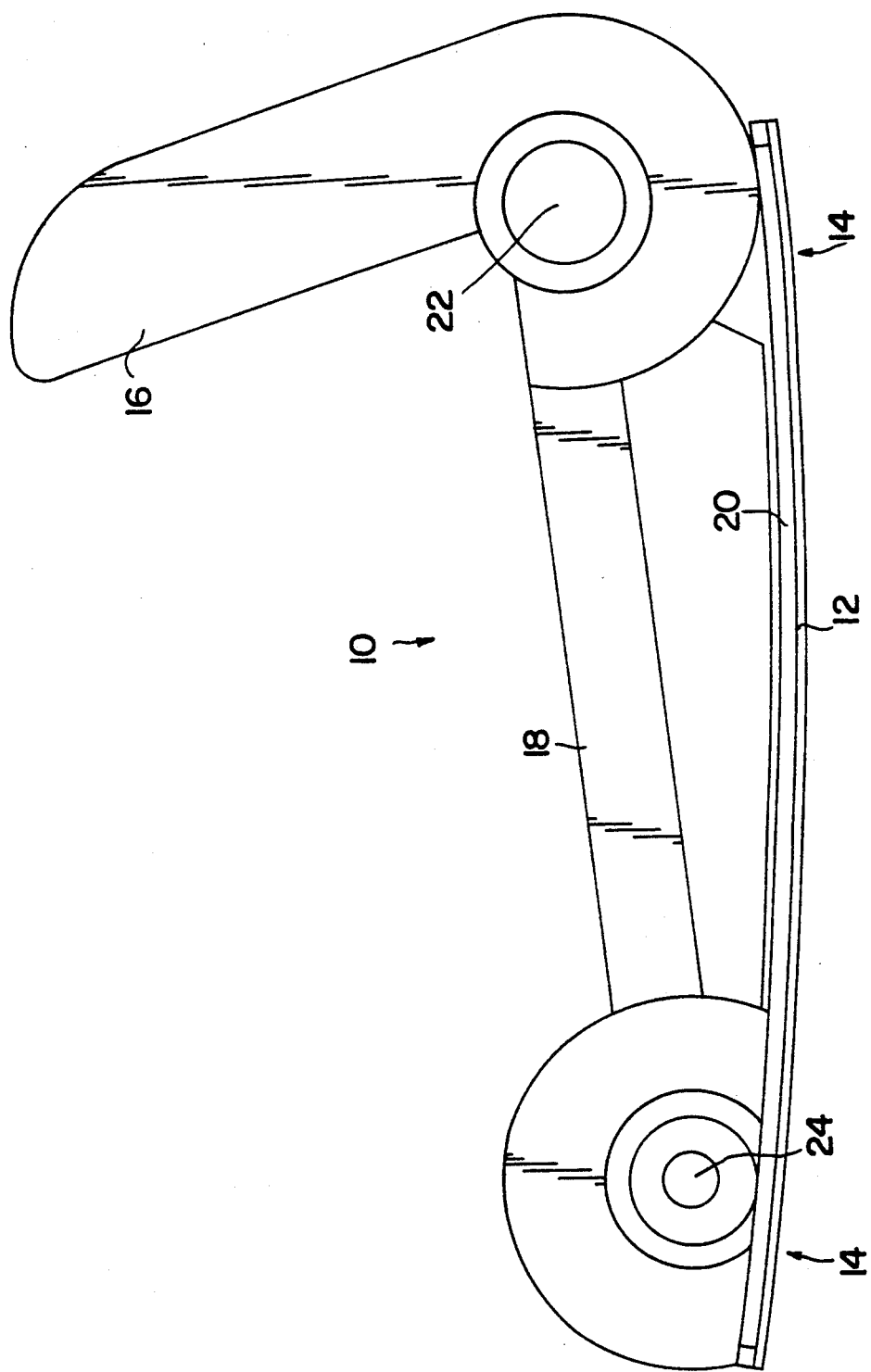
FIG. 2 is an elevation of a second embodiment.

Once the components of the file holder 10 have been assembled as described above, a flexible file blade is attached to the base 20 by means of grub screws or other appropriate fastenings. The file blade may then be flexed in the following way. As the handle 16 rotates on the plinth 28, the cam surface 66 and cam following lugs 50 co-operate to pull the tension bar 18 in the direction of the handle, or to allow the tension bar 18 to move away from the handle. However, by virtue of the attachment of the hooked terminal portion 38 to the base 20, this movement can only take place when accompanied by flexing of the base member and of the file blade which lies along it. Thus, as the handle rotates in the anti-clockwise direction (as seen in FIGS. 1, 2, 6 and 8) the cam surface 66 pulls the tension bar 18 progressively further towards the handle 16 thereby increasing the flexion of the file blade. Conversely, as the handle 16 is rotated in the clockwise direction as seen in those figures, the cam surface 66 allows the tension bar 18 to move in the opposite direction, allowing the base 20 and file blade 12 to relax and straighten. It will be appreciated from a consideration of FIG. 6 that when the handle 16 is fully rotated in the clockwise direction to the position shown in FIG. 8, the blade will be straight and the handle will lie generally parallel with the blade 12. The handle 16 and blade 12 are then in positions resembling the positions of the handle and blade of a traditional engineer's file. Conversely, when the handle 16 is rotated to apply maximum flexion to the blade 12, the file holder resembles a woodworking plane, as shown in FIGS. 1 and 2. An additional handle may be formed in the region of the lugs 32 to enhance the comfort of use of the holder when in this condition.

It is envisaged that the file holder described can be manufactured from four main moulded plastics components, namely the base 20 (incorporating the lugs 32, plinth 28 and cylindrical member 29), the tension bar 18 with its hooked and lugged terminal portions 38, 40, and two handle halves attachable to form the handle 16.

Variations and modifications may be made to the apparatus described above without departing from the scope of the present invention. In particular, considerable variations are feasible in the pivotal connections between the tension bar 18 and base 20, and between the handle 16 and plinth 28. In an alternative to the above described embodiment, it is envisaged to replace the hooked terminal portion 38 with a pinned terminal portion having pins which engage sockets in the lugs 32 with a snap-fit. A tension bar 18 of this type could be threaded between the lugs 32 through an opening in the base 20, prior to fitting of a file blade, until the lugs on the tension bar 18 are snapped into the recesses in the lugs 32, after having passed along entrance slots extending between the opening in the base and the recesses. Further assembly of the holder would then proceed as described above. Alternatively the lugs and attachment means could be formed on a separate component detachable from the base and to which the tension bar is attached before the component is attached to the base.

The holder has been described as holding flexible file blades, but it will be appreciated that the structure could be used to hold other flexible members.

The arrangement for mounting the handle 16 on the plinth 28 may be adapted to incorporate a releaseable ratchet mechanism or other detent mechanism which allows the orientation of the handle 16 and the flexion of the blade 12 to be set.

I claim:

1. A file holder comprising first and second attachment means for attaching a flexible file blade to the holder in spaced-apart relation, a first member incorporating a cam surface and being so connected to the first attachment means as to be movable with respect thereto, a second member connected to the second attachment means and incorporating a cam follower bearing on the cam surface, the cam surface being so shaped as to vary the spaced-apart relation of the attachment means as the first member moves, said spaced-apart relation being variable by the cam surface between a first position in which the attachment means are relatively far apart and the said blade is relaxed and straight, and a second position in which the attachment means are relatively close together and the said blade is flexed, whereby a file attached to the holder may be variably flexed.

2. A holder according to claim 1, wherein a flexible base member is provided which carries the attachment means and the first and second members.

3. A holder according to claim 2, wherein the attachment means are detachable from the base member.

4. A holder according to claim 2, wherein the attachment means and the base member are so arranged that a file mounted in the holder lies along the base, the base and the file flexing together as the first member is moved.

5. A holder according to claim 2, wherein the first member is rotatable on the base member.

6. A holder according to claim 5, wherein the first member is rotatable about a first axis, the cam surface being circular and centered on a second axis.

7. A holder according to claim 5, wherein the first member comprises an integral handle by means of which the first member may be rotated.

8. A holder according to claim 7, wherein the integral handle comprises a portion around which the fingers of a user may be closed to grasp the handle, the cam surface being so shaped that, in use, the graspable portion is generally parallel to an unflexed file blade held in the holder.

9. A holder according to claim 1, wherein the first member comprises an arcuate slot, the walls of which provide the cam surface.

10. A holder according to claim 9, wherein the cam surface is formed by the surfaces of a groove or recess in the slot walls.

11. A holder according to claim 10, wherein the second member extends into the slot, and the cam follower comprises a lug which engages the cam surface provided by the walls.

12. A holder according to claim 11, wherein the cam follower comprises a second, oppositely directed lug engaging a second cam surface, the cam surfaces being provided by respective walls of the slot.

13. A holder according to claim 12, wherein the mouth of the slot is relatively narrow and the width of the slot in the region of the cam surface is relatively wide, whereby the lugs retain the second member in the slot.

14. A holder according to claim 12, wherein the first member comprises two parts each providing one of the cam surfaces and attachable together to form the slot therebetween.

15. A holder according to claim 1, wherein the second member is in the form of a bar having the cam follower at a first end and being rotatably attached to the second attachment means at its second end.

16. A holder according to claim 15, wherein the second end is attached to the base member by means of two lugs attached to the base member and between which the second end is located by means of co-operating pins and sockets.

* * * * *